United States Patent [19]

Maiocchi

[11] 4,293,019
[45] * Oct. 6, 1981

[54] BREAKER FOR RADIAL TIRE

[75] Inventor: Luigi Maiocchi, Milan, Italy

[73] Assignee: Industrie Pirelli S.p.A., Milan, Italy

[*] Notice: The portion of the term of this patent subsequent to Oct. 2, 1996, has been disclaimed.

[21] Appl. No.: 18,666

[22] Filed: Mar. 8, 1979

[30] Foreign Application Priority Data

Mar. 9, 1978 [IT] Italy .............................. 20994 A/78

[51] Int. Cl.³ .................................................. B60C 9/20
[52] U.S. Cl. ........................ 152/361 R; 152/361 DM
[58] Field of Search ...... 156/361 R, 361 DM, 361 FP

[56] References Cited

U.S. PATENT DOCUMENTS

| | | | |
|---|---|---|---|
| 2,958,359 | 11/1960 | Baussu et al. | 152/361 |
| 3,625,272 | 12/1969 | Fletcher | 152/357 |
| 3,667,527 | 6/1972 | Magistrini et al. | 152/361 R |
| 4,140,168 | 2/1979 | Caretta | 152/361 FP |
| 4,169,495 | 10/1979 | Maiocchi | 152/361 R |

*Primary Examiner*—Michael W. Ball

*Attorney, Agent, or Firm*—Stevens, Davis, Miller & Mosher

[57] ABSTRACT

A pneumatic tire having a radial carcass which is adapted for use on heavy duty motor vehicles such as trucks and buses is provided with an annular reinforcing structure in the crown of the tire between the carcass and the tread band having at least three layers of metal cords with the two layers which are radially inner of the third layer being of cords having an ultimate elongation of about 3% and the cords of the third layer having an ultimate elongation of about 4% to about 8%. The cords of each of the two radially inner layers are substantially parallel to each other and inclined with respect to the direction of travel of the tire but the cords of one of the two layers cross those of the other layer. The cords of the third layer are substantially parallel to each other and to the direction of travel of the tire. The third layer has a central strip astride the center line of the tire and a lateral strip on each side of the center strip which is more resistant to tension and compression stresses than the center strip.

6 Claims, 4 Drawing Figures

BREAKER FOR RADIAL TIRE

This invention relates to pneumatic tires for vehicle wheels and, in particular, to pneumatic tires provided with a radial carcass (i.e., a carcass whose cords lie on meridian planes or form small angles with such planes) particularly suitable for heavy motor vehicles used for both normal and heavy duty and intended to be used on long distances at normal and high speeds.

It is known that radial tires are usually provided with a structure having one or more layers of reinforcing material arranged below the tread at the crown zone of the carcass. Such reinforcement is provided primarily to withstand the tension stresses to which the tire is subjected either because of the inflation pressure or high speeds under service conditions.

Of course, in large-sized tires used on motor vehicles for normal and heavy duty, such as buses, coaches, or trucks, not only the tension but also the compression stresses exerted on the reinforcing structure are very high.

Hence, such tires must be provided with an extremely resistant reinforcing structure which does not have too many layers, since that would involve an increase in weight and in thickness of the tire. Too much weight or thickness causes higher hysteresis and, therefore, the development of more heat in service with a corresponding decrease in the resistance of the tire.

It has been proposed to solve this problem by forming the annular reinforcing structure with a minimum number of layers of a material having a high modulus of elasticity.

For example, a reinforcing structure consisting of two layers of crossed metal cords having an ultimate elongation equal to about 3% with the cords parallel to one another in each layer and inclined symmetrically with respect to the longitudinal direction of the tire at a relatively small angle, i.e., an angle of between 5° and 30°.

In this way, the intrinsic stiffness of the material forming the two layers is attenuated somewhat by some flexibility of the resulting reinforcing structure since, for example, the tension stress due to the tire inflation results in a decrease in the relative angle of inclination for the cords of the two layers and a consequent increase in diameter of the tire itself.

As a consequence, the reinforcing structure is quite satisfactory, not only from the point of view of its resistance to stresses, but also as regards its torsional and transverse stiffness. This provides a tire which has good driving behavior, particularly good driving stability, both when the tire runs along a straight course and in the presence of the drift phenomenon when the tire runs along a curved course.

On the other hand, large-sized tires having a radial carcass formed of only one ply of metal cords have the disadvantage that although a single-ply annular reinforcing structure withstands effectively the stresses to which the tire is subjected, it is not capable of counterbalancing the high carcass flexibility with the result that the tire does not respond properly to steering of the wheel on which it is mounted.

Therefore, it is necessary to add other layers or plies of reinforcing material to stabilize the tire. Usually an additional strip of metal cords oriented with respect to the longitudinal direction of the tire and forming a high angle, for example of 60°, is added for this purpose.

It is disclosed that, contrary to what has been aforesaid, the placing upon a reinforcing structure having only two layers of metal cords oriented as above with respect to the direction of travel of the tire, of a layer of metal cords having a relatively high elongation (4%–8%) and arranged in a substantially parallel direction with respect to the longitudinal direction of the tire, not only effects the driving stability of the tire which until now was considered due exclusively to strips of metal cords having a high inclination with respect to its longitudinal direction, but also provides a very high resistance both to tension and compression stresses.

More specifically, a reinforcing structure thus constituted combines a sufficiently high resistance for withstanding not only the tension stresses due to the inflation pressure of the tire, but also those which occur when the tire runs at high speeds along both a straight and a curved course. This type of reinforcing structure is described in patent application Ser. No. 753,290 filed Dec. 22, 1976, now abandoned, and assigned to the assignee of this application.

It has since been shown under several conditions that the disclosed reinforcing structure, although better than other known structures, is not entirely satisfactory for large-sized tires employed at high speeds.

Without any intention of limiting or conditioning thereby the objects of the present invention, the present applicant believes that this loss in quality of performances for large tires is due to the fact that, with the increase of the tire speed and sizes, the tension stresses exerted on the annular reinforcing structure concentrate more rapidly on the edges than in the center of the structure. This is a hypothesis which finds also a logical explanation, considering that the tire thickness increases progressively from the center of the tread towards its shoulders, in consequence of the greater bending of the inner carcass profile with respect to the tire outer profile, of course on a radial plane. In fact, with increase of the speed of rotation of the tire, this greater mass of material present at the extremities of the annular reinforcing structure causes a greater centrifugal force and, therefore, more intense tension stresses in the above-described structure which withstands the expansion of the carcass. Moreover, the percentage of stress due to the centrifugal action, which is very slight and therefore substantially nonappreciable in normal conditions, and in small-sized tires, if compared to that due to the inflation pressure, on the contrary increases in a substantial amount at high speeds, especially for tires of larger sizes, since it increases in proportion to the weight of the material and the square of the speed.

It is apparent that in this situation, the reinforcing annular structure intended to bear a nearly uniform distribution of tension stresses cannot carry out its functions as desired, with consequent negative influences on the tire behavior. The situation is made worse by the fact that extremities of the annular reinforcing structure just in the zone where both tension and compression stresses are more intense is weaker than in its central part. All of that is due to two factors. The former connected to the intrinsic structure of the strips of cords, which show on the extremities a loss of stiffness well known by technicians of this art under the name of "salvage effect"; the latter being due to the presence of graduations among the different belt strips. For the above reason, the quantity of stress resistant material suffers a decrease localized in these zones with respect to the remaining central part of the annular structure.

It is therefore an object of this invention to provide a radial tire for motor vehicles which even in large sizes for heavy motor vehicles has a reinforcing structure with a small number of plies which is devoid of the foregoing disadvantages and has driving stability combined with good resistance both to tension and compression stresses. Another object of the invention is to provide a pneumatic tire having a radial carcass which can be built in large sizes for heavy duty motor vehicles such as trucks and buses without a reinforcing structure of several plies and a disadvantageous thickness. Other objects will become apparent from the following description with reference to the accompanying drawing wherein FIG. 1 illustrates, in radial section, one embodiment of the crown of a tire provided by the invention;

Figure 1:
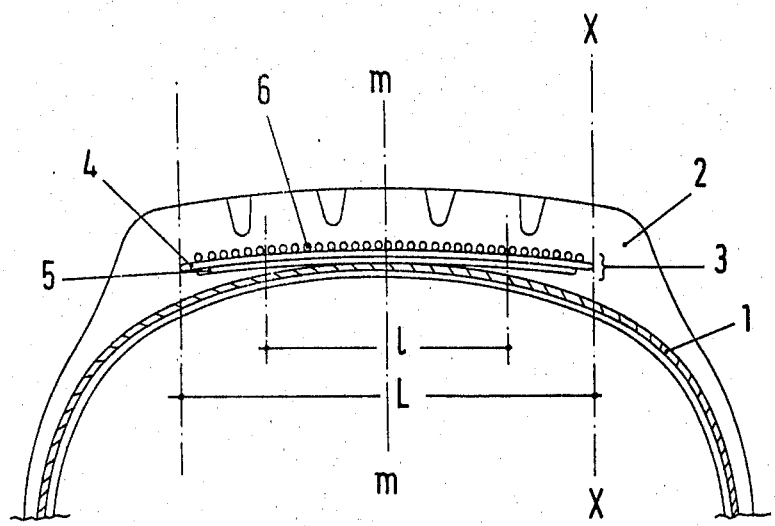

Accordingly, the present invention provides improvements in the annular reinforcing structure of tires, which eliminate the just now explained disadvantages guaranteeing to the tire a suitable behavior in any running condition.

The foregoing objects and others are accomplished in accordance with the present invention by providing a pneumatic tire for motor vehicles adapted to be used for normal and heavy duty and having a carcass and a tread band provided with a reinforcing annular structure inserted between the carcass and tread band which reinforcing structure has at least three layers of metal cords which layers are substantially as wide as the tread with the two layers which are arranged in a radially inner position with respect to the third layer being provided with metal cords having an ultimate elongation of about 3%. The cords are arranged parallel to one another in each layer and are crossed with respect to those of the other layer. The cords in the said two layers are symmetrically inclined with respect to the longitudinal direction of the tire at an angle of 5° to 30°. The third layer is arranged in a radially outer position and comprises metal cords having an ultimate elongation of 4% to 8%. The cords of the third layer are parallel to one another and are arranged substantially parallel to the longitudinal direction of the tire. The third layer consists essentially of a central strip placed astride of the center line of the tire and has a width of between 40% and 80% of the total width of the third layer, and two lateral strips placed side by side with the central strip, each of the lateral strips having on its whole a greater resistance to tension and compression stresses than that of the central strip.

According to some particularly advantageous embodiments, the object of the present invention is achieved with two lateral strips of HE (high elongation) metal cords which are thicker than the central strip formed from the same metal cords. Otherwise, lateral strips of metal cords may be provided which have a greater stress resistant section than the cords of the central section, and therefore absorb, the elongation being equal, a greater stress, just like that originating in these zones.

It is obvious that the hereinbefore reported characteristics are obtained through a correct choice of the geometrical and constructive characteristics of the cords. For example, the reinforcing cords of the said lateral strips may have either the same formation as the cords of the central strip but formed of elementary wire having a greater cross-section, or the lateral strips may be formed of the same kind of elementary wires but have a different formation or it may have both a different formation and different sized wires.

It is thus clear that the application of the lateral strips of cords to the tire carcass during its manufacturing process may be carried out through one of the many known methods, for example by applying already prepared strips or by helically winding a single cord along successive convolutions placed side by side with one another.

Referring now to FIG. 1, the crown zone of a tire provided by the invention has a carcass 1 provided with only one radial metal ply, a tread band 2, on whose radially outer surface is molded the tread pattern, and an annular reinforcing structure 3, inserted between carcass and tread built by conventional methods.

The annular structure 3 has two layers 4 and 5 of conventional metal cords (an ultimate elongation of about 3%) arranged in a radially inner position with respect to the whole structure. The cords are parallel to one another in each layer, are crossed with respect to those of the other layer, symmetrically oriented and form an angle of about 18° with respect to the longitudinal direction of the tire. Depending upon the type of tire, this angle may vary from 5° to 30°.

A third layer 6, of metal cords, is positioned radially outwardly with respect to layers 4 and 5.

The cords of layer 6 are of a HE (high elongation) type (i.e., an ultimate elongation between 4% and 8%) and are oriented parallel to the median plane m-m of the tire, that is at 0° with respect to its longitudinal direction.

From FIG. 1, showing the development in quality of the inner and outer profiles of the generic tire, it may be noted at once that the thickness of the tire, and therefore the quantity of material rotating around the tire axis during the employment of the latter, increases, changed from the median longitudinal section m-m, to the shoulders, for example to the section X-X.

It may be understood that this lack of uniformity in the axial distribution of the material, for large-sized tires and at higher speeds, causes a localized increase in the centrifugal force exerted on the shoulders of the tire with a consequently greater radial expansion of the tire in this zone and, therefore greater tension stresses concentrated at the extremities of the annular structure.

To withstand these greater stresses and to restore conditions of uniform tension in the above-said structure, the resistance to stresses, in particular to tension stresses only as concerns the radially outer layer, at its extremities, has been increased. In other words, the layer formed of metal cords at 0° is subdivided into three strips placed side by side with one another, namely a central strip, arranged astride of the center line of the tire, having a width "l" varying from 40% to 80% of the total wide L of the annular structure, and two lateral strips, each of them placed side by side with the above structure (FIG. 1).

Figure 2:
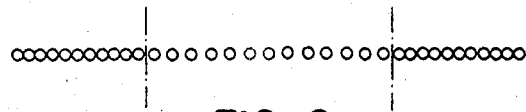
FIG. 2 illustrates a first embodiment of the layer of cords of an annular reinforcing structure of the tire provided by the invention, with the cords oriented at 0° with respect to the longitudinal direction of the tire.

To obtain the above said desired increase in resistance to stresses of the aforesaid lateral strips, according to a first embodiment (FIG. 2) the metal cords in these strips are more closely spaced than the cords in the central strip.

For example, in a tire of the size 11 R 22.5, having the layer at 0° made with a HE cord 3×7/0.20, the central strip 1 has a width which is equal to 50% of L, and a thickness of 45 wires/dm against a thickness of 55 wires/dm in the remaining lateral portions of the layer.

It is clear that a layer of cords of this type may still be realized, in ways already known by technicians of this art, by winding on the tire carcass, already provided with the layers of cords 4 and 5, either at the same time or in successive steps, the three different strips all separately prepared beforehand, or by helically winding in a very suitable way, the pre-established cord along convolutions placed side by side with one another, of course changing the winding pitch of the cord from the lateral strip to the central one and again, vice-versa from the central strip to the lateral one.

However, the choice of the most suitable process to obtain both this structure and the hereinafter described ones is not difficult for a technician of this art, and, in any case, does not fall within the objects of the present invention.

According to some other embodiment, the increase in resistance is obtained by using for the lateral strips HE (high elongation) cords showing a greater stress resistant section, that is, in particular, higher absolute values of resistance to elongation, of course with respect to the cords forming the central strip of the layer.

The object may be easily achieved by changing the geometrical and structural characteristics of the cord used, for example by employing cords of different diameter.

Figure 3:
FIG. 3 illustrates a second embodiment of the layer of cords shown in FIG. 2.
Figure 4:
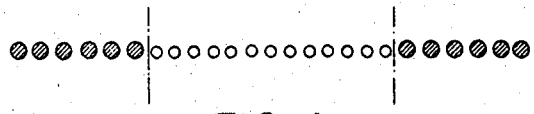
FIG. 4 illustrates a third embodiment of the layer of cords of the reinforcing structure oriented at 0° with respect to the longitudinal direction of the tire.

For a tire of the size 11 R 22.5 according to a second embodiment the central strip may be obtained with a HE cord 3×7/0.20 while the lateral strips may employ a HE cord 3×7/0.22, see FIG. 3 where the cross-section of the cords is illustrated with circles of diverse diameters, respectively. A third embodiment consists in employing for the above-mentioned lateral strips metal cords formed of the same elementary wire but showing a different geometrical configuration with respect to the cords of the central strip. Said embodiment may be realized by means of a tire of the size 11 R 22.5 provided with a layer of metal cords at 0° wherein the cords of the lateral strips are, for example, HE F45 cords 4×7/0.20 or HE F45 cords 3×10/0.20, illustrated in FIG. 4 with black circles while the cords of the central strip are HE F45 cords 3×7/0.20 (white circles of small diameter in FIG. 4).

It is therefore apparent that many other embodiments are possible which are not expressly described in the present application. For example, all those which may be easily obtained from the combination of the peculiar characteristics of the above referred to cords.

Although the invention has been described in detail for the purposes of illustration, it is to be understood that such detail is solely for the purpose of illustration and that variations can be made therein without departing from the spirit and scope of the invention except as it may be limited by the claims.

What is claimed is:

1. A pneumatic tire for motor vehicles comprising a carcass, a tread band and a reinforcing annular structure inserted between said carcass and said tread band, said reinforcing annular structure comprising at least three layers of metal cords, said layers being substantially as wide as the tread band, two layers which are arranged in a radially inner position with respect to the third layer comprising metal cords having an ultimate elongation of about 3%, said metal cords being parallel to one another in each layer and crossed with respect to those of the other layer, said cords in said two layers being symmetrically inclined with respect to the longitudinal direction of the tire and forming an angle between 5° and 30°, the third layer being arranged in a radially outer position and comprising metal cords having an ultimate elongation between 4% and 8%, the cords of said third layer being substantially parallel to one another and arranged substantially parallel to the longitudinal direction of the tire, said third layer consisting essentially of a central portion extending astride of the center line and having a width between 40% and 80% of the total width of said layer, and two lateral portions extended side by side with said central portion, each of said lateral portions having a greater resistance to tension and compression stresses than that of said central portion.

2. The pneumatic tire of claim 1 wherein said lateral portions comprise cords more closely spaced than in the said central portion.

3. The pneumatic tire of claim 2 wherein the cords of said third layer are helically wound cords of a high elongation type along successive convolutions placed side by side with one another, the pitch of said winding in said central portion being higher than the winding pitch in said lateral portions.

4. The pneumatic tire of claim 1 wherein the cords of said lateral portions have a greater stress resistant section than the cords of said central portion.

5. The pneumatic tire of claim 4 wherein the cords of said lateral portions are of wires having a larger diameter than those of the cords of said central portion.

6. The pneumatic tire of claim 4 or 5 wherein the cords of said lateral portions have a different geometrical configuration from that of the cords of said central portion.

* * * * *